United States Patent

Terada et al.

Patent Number: 5,666,454
Date of Patent: Sep. 9, 1997

[54] PREFORM FOR OPTICAL FIBER AND METHOD OF PRODUCING OPTICAL FIBER

[75] Inventors: Jun Terada; Hideaki Chiba; Mituhiro Kawasaki; Tadashi Takahashi, all of Tokyo, Japan

[73] Assignee: The Furukawa Electric Co., Ltd., Tokyo, Japan

[21] Appl. No.: 569,163
[22] PCT Filed: Apr. 25, 1995
[86] PCT No.: PCT/JP95/00814
  § 371 Date: Apr. 16, 1996
  § 102(e) Date: Apr. 16, 1996
[87] PCT Pub. No.: WO95/29132
  PCT Pub. Date: Nov. 2, 1995

[30] Foreign Application Priority Data

Apr. 25, 1994 [JP] Japan ................................. 6-86419

[51] Int. Cl.⁶ .................... G02B 6/02; C03B 37/023
[52] U.S. Cl. ................ 385/123; 385/28; 385/141; 65/385; 65/426
[58] Field of Search ........................ 385/123, 124, 385/126, 127, 141, 142, 144, 28; 65/385, 399, 414, 422, 426

[56] References Cited

U.S. PATENT DOCUMENTS

| | | | |
|---|---|---|---|
| 4,217,027 | 8/1980 | MacChesney et al. | 385/123 X |
| 4,877,304 | 10/1989 | Bhagavatula | 385/123 |
| 5,035,477 | 7/1991 | Schlump | 385/123 X |
| 5,329,607 | 7/1994 | Kamikawa et al. | 385/123 |
| 5,361,319 | 11/1994 | Antos et al. | 385/123 |
| 5,381,503 | 1/1995 | Kanamori et al. | 385/123 |
| 5,446,820 | 8/1995 | Ishikawa et al. | 385/123 |
| 5,581,647 | 12/1996 | Onishi et al. | 385/123 |

*Primary Examiner*—Brian Healy
*Attorney, Agent, or Firm*—Nikaido, Marmelstein Murray & Oram LLP

[57] ABSTRACT

A single-mode optical fiber preform is produced by a process where a porous glass body of a core rod for a single-mode optical fiber is dehydrated and made into a glass to prepare a core rod for the optical fiber, clad layers are deposited on the circumference of the core rod for the optical fiber so as to give an outer diameter of a desired value, and then these are dehydrated and made into glass. At this time, the diameter of a part corresponding to the core rod for the optical fiber in the optical fiber obtained by drawing the preform for optical fiber is controlled to 1.9 times or more the mode field diameter, which is a diameter that allows light having a wavelength of 1.55 µm to pass therethrough. As a result, a preform for a single-mode optical fiber with which an optical fiber little influenced by defects can be obtained can be produced.

9 Claims, 4 Drawing Sheets

PREFORM FOR OPTICAL FIBER AND METHOD OF PRODUCING OPTICAL FIBER

TECHNICAL FIELD

The present invention relates to an optical fiber such as a dispersion-shifted single-mode (DSF) optical fiber or single-mode optical fiber, more particularly relates to a method of producing a core rod for optical fibers so as to obtain a DSF or single-mode optical fiber having the desired characteristics.

BACKGROUND ART

First, a description will be made of a dispersion shift single-mode optical fiber.

The usually used dispersion-shifted single-mode optical fiber (hereinafter simply referred to as a dispersion-shifted optical fiber or a DSF) having an outer diameter of 125 μm has at its center a core part having a higher refractive-index than that of its circumference. When viewing the construction of this DSF from the standpoint of the distribution of the intensity of the light, the intensity of the light is the largest at the center of the DSF, and the intensity of the light becomes smaller as the light approaches the outer circumference away from the center. The change of that intensity is of a sharp bell-shaped curve. Usually, in such a case, the center portion of the DSF is called as the "mode field", and the diameter thereof is called the "mode field diameter". Note that, although the mode field diameter slightly differs according to some conditions, when the wavelength of the light which is propagated is 1.55 μm, the general construction of the DSF has a mode field diameter of about 8 μm.

A preform for a DSF having a construction as mentioned before is produced (manufactured) as follows. (a) First, a porous glass body of a core rod for a DSF including a core portion in which at least a metal dopant exists is synthesized by a VAD method etc (at present, frequently, part of the cladding portion is synthesized together with the core portion, and hereinafter, one including also a part of this cladding portion is referred to as a core rod for the DSF). (b) Subsequently, the porous glass body is dehydrated and sintered to form the core rod for the DSF. (c) Further, using the core rod for the DSF as a target rod, a porous glass layer having a desired thickness corresponding to the cladding layer is formed on the outer circumference thereof by an outer vapor deposition (OVD method) etc., then (d) that porous glass layer is dehydrated and formed into a glass, thereby to obtain a preform for the DSF. (e) Thereafter, that preform for the DSF is heated and drawn, thereby to obtain a DSF having a desired thickness.

In recent years, due to the advances made in various technologies, it has become possible to obtain a large size preform for a DSF. In this case, among the aforementioned manufacturing steps, the manufacturing step of forming the porous glass layer by the OVD method or the like and the manufacturing step of dehydration and glass-forming of the porous glass are often repeated to fabricate the large sized preform for a DSF.

The above conventional manufacturing method of a large size DSF is characterized in that the transmission characteristic is easily controlled. No superior manufacturing method to take the place of this has yet been found.

However, in the above manufacturing method, the manufacturing steps for making a single preform comprise at least two different manufacturing steps of the VAD method and OVD method. For this reason, a boundary surface exists between the glasses manufactured by the different steps. It is known that defects are apt to occur at the boundary surface. Also, glass has a different viscosity according to the content of impurities. Usually, the purity of the glass existing on the outer circumference of the core rod portion formed by the OVD method or the like tends to be low in comparison with the purity of the core rod portion. Also, in the core rod, the concentration of the metal dopant in the diameter direction is not constant since the distribution of refractive-index is controlled. For this reason, the viscosity of the glass of the dispersion-shifted optical fiber is not uniform.

The defects of the glass mentioned before exert the following effects upon the DSF. For example, when the DSF manufactured by the conventional method is left to stand in a hydrogen atmosphere for a long time, the hydrogen disperses in the DSF. Next, the dispersed hydrogen enters into the defects of the glass and forms Si-H bonds. The Si-H bonds absorb the light having a wavelength of 1.52 μm among the light propagated through the DSF and causes a loss, i.e., causes a so-called increase of hydrogen loss, so the transmission loss becomes large.

Moreover, hydrogen exists also in the atmosphere, and therefore if there is such a tendency in the DSF, even in a case where the DSF is left to stand in the atmosphere, it is clear that the DSF will be influenced in some way. In view of this situation, a DSF little effected by defects at the boundary surface of the glasses formed by the different manufacturing steps has been required.

Further, in the optical fiber preform of a DSF, the purity of the glass formed by the OVD method is lower than that of the core rod portion. Also, the concentration of the metal dopant is not constant due to the distribution of the refractive-index in the diameter direction in the core rod. Particularly, where a cladding layer not containing a metal dopant is formed at the same time as that for the core portion in the outer layer portion of the core rod, from the center of the optical fiber, three concentric circular parts of a layer having a high purity and containing a metal dopant, a layer having a high purity and not containing the metal dopant, and a layer having a low purity and substantially not containing the metal dopant are formed. The glass containing a metal dopant and impurities has a lower viscosity in comparison with the glasses not containing them and therefore exhibits a three-concentric circle construction including a part having a low viscosity, a part having a high viscosity, and a part of a low viscosity corresponding to the construction of the DSF.

When drawing the preform of DSF having such a distribution of viscosity, a tensile strain is added to the part where the viscosity is high. For this reason, distortion remains in the DSF after drawing and the strength of the DSF was sometimes greatly lowered.

Next, a description will be made of the conventional single-mode optical fiber.

The usually used single-mode optical fiber having an outer diameter of 125 μm has a core having a diameter of about 10 μm at the center and a cladding having a diameter of 125 μm formed on the outer circumference thereof. The refractive-index of the core at the center of the single-mode optical fiber is higher than the refractive-index of the cladding on the circumference thereof. Viewing the construction of this single-mode optical fiber from the standpoint of the distribution of the intensity of light, the intensity of the light is the largest at the center (core) of the optical fiber, and the intensity of the light becomes smaller as the light approaches the outer circumference away from the center. Namely, a sharp bell shaped curve distribution is exhibited. Usually, in such a case, the center portion of the single-mode optical fiber is called the "mode filed", and the diameter thereof is called the "mode field diameter". Note that, although the mode field diameter slightly differs according to some conditions, when the wavelength of the light to be propagated is 1.55 µm, the general construction of the single-mode optical fiber has a mode field diameter of about 9 to 11 µm.

A preform for the single-mode optical fiber having a construction as mentioned before is manufactured as follows: (1) First, a porous glass body of a core rod for the optical fiber including at least the core portion is synthesized by the VAD method etc (at present, frequently, part of the cladding portion is synthesized together with the core portion, and hereinafter, one including also a part of this cladding portion is referred to as a core rod for the optical fiber). (2) Subsequently, the porous glass body is dehydrated and sintered to form the core rod for the optical fiber. (3) Further, the core rod for the optical fiber is used as a target rod, (4) a porous glass layer having a desired thickness corresponding to the cladding layer is formed on the outer circumference thereof by the OVD method or the like, and then (5) that porous glass layer is dehydrated and formed into a glass, thereby to obtain the preform for the optical fiber.

In recent years, due to the advances made in various technologies, it has become possible to obtain a large-size preform for an optical fiber. In this case, among the aforementioned manufacturing steps, the manufacturing step of forming the porous glass layer by the OVD method or the like and the dehydration and glass-forming step of the porous glass are repeated to manufacture the large-scale preform for the optical fiber.

The aforementioned conventional manufacturing method of a large-size optical fiber is characterized in that the distribution of the refractive-index at the center part is easily controlled. A manufacturing method to take the place of this has not yet been found at present.

However, in the above manufacturing method, the manufacturing steps for forming a single preform comprise at least two different manufacturing steps of the VAD method and OVD method. For this reason, a boundary surface exists between the glasses manufactured by the different steps. It is known that defects are apt to occur at the boundary surface.

The above defects of the glass exert the following effects upon the optical fiber. For example, when a single-mode optical fiber obtained by drawing a preform for an optical fiber manufactured by the conventional method is left to stand in a hydrogen atmosphere for a long time, the hydrogen disperses in the optical fiber. Next, the dispersed hydrogen enters into the defects of the glass and forms Si-H bonds. The Si-H bonds cause an increase of the so-called hydrogen loss, i.e., absorb the light having a wavelength of 1.52 µm among the light propagated through the optical fiber, and thus the transmission loss becomes large.

Moreover, hydrogen exists also in the atmosphere, and therefore if there is such a tendency in the optical fiber, it is clear that, even in a case where the single-mode optical fiber is left to stand in the atmosphere, the single-mode optical fiber will be influenced in some way.

DISCLOSURE OF THE INVENTION

In view of this situation, it has been desired to find a producing (manufacturing) method for a preform for an optical fiber with which an optical fiber little effected by defects at the boundary surface of the glasses formed by different producing (manufacturing) steps can be obtained.

Accordingly, an object of the present invention is to provide a preform for a dispersion-shifted optical fiber (DSF) little effected by defects and having a high strength and further provide a DSF from this.

Another object of the present invention is to provide a preform for a single-mode optical fiber and further provide a single-mode optical fiber.

Dispersion-Shifted Single-Mode Optical Fiber

According to the present invention, there is provided a DSF obtained by the steps wherein (1) a porous glass body of a core rod for a dispersion-shifted single-mode optical fiber (DSF) is dehydrated and made into a glass to obtain a core rod for a optical fiber; (2) a cladding layer substantially not containing a metal dopant are deposited on the circumference of the core rod for the DSF so as to give an outer diameter of a desired value; (3) these are dehydrated and made into glass to produce (manufacture) a silica glass optical fiber preform; and (4) the preform is subjected to heat-drawing, characterized in that the diameter of a part corresponding to the core rod for the optical fiber is 1.9 times or more the mode field diameter when transmitting a light having a wavelength of 1.55 µm and the thickness of the cladding layer existing at the outer layer portion of the aforesaid core rod is within a range of from 0 to 6 µm with respect to a fiber having a diameter of 125 µm.

First, a description will be made of the increase of hydrogen loss due to defects. The distribution of the intensity of the light propagated in the DSF in the optical fiber diameter direction draws a sharp bell curve where the intensity is the largest at the center and tapers sharply off as the light goes toward the outer circumference. If the part in which the light is propagated has a factor absorbing the light, the light is absorbed at that part and the intensity is reduced, whereby an increase of the transmission loss is induced. However, since the intensity of the light is not uniform with respect to the diameter direction of the optical fiber, the intensity which is reduced due to the absorption of the light differs in the diameter direction of the optical fiber. More specifically, it was seen that where there is a factor absorbing the light in the sharply tapered off parts of the aforesaid intensity distribution, there is little effect on the overall intensity of light, but as the absorbing factor approaches the center part, the amount of light which is absorbed becomes larger and the overall intensity of light was reduced.

When applying this theory to a conventional dispersion-shifted optical fiber, as the defects of the glass which cause of formation of the Si-H bonds functioning as factors absorbing the light move further away from the part in which the light is propagated, that is, the mode filed, the amount of the light which is absorbed becomes smaller. When exceeding a certain limit, it becomes possible to ignore that influence. Concretely, it is sufficient so far as the boundary surface caused by the different producing (manufacturing) steps be positioned away from the mode filed to a certain extent. Therefore, the inventors carried out experiments so as to actually prove this and succeeded in expressing how much the aforesaid boundary surface has to be positioned away from the mode filed by a value obtained by dividing the diameter of the aforesaid boundary surface in the dispersion-shifted optical fiber by the mode field diameter (hereinafter, simply referred to as a "boundary surface diameter/mode field diameter").

However, where the thickness of the cladding layer existing in the outer circumference portion of the core rod is increased and the boundary surface diameter/mode field diameter is increased, as mentioned before, the thickness of the glass layer not containing the metal dopant and having a high purity becomes large. For this reason, a part where the tensile strain remains after drawing becomes large and the strength is lowered. So as to prevent this, it is sufficient so far as the thickness of the cladding layer not containing the metal dopant on the outer circumference of the core rod be restricted so as to obtain a strength that causes no problem in practical use.

Therefore, the inventors carried out further experiments and found the limit value of thickness of the cladding layer not containing the metal dopant on the outer circumference of the core rod.

Single-Mode Optical Fiber

The present invention also provides a method of producing a single-mode optical fiber preform by the steps where a porous glass body of a core rod for a single-mode optical fiber is dehydrated and made into a glass to obtain a core rod for the optical fiber, a cladding layer is deposited on the circumference of the core rod for the optical fiber so as to give an outer diameter of a desired value, and then these are dehydrated and made into glass, characterized in that the diameter of the part corresponding to the core rod for the optical fiber of the single-mode optical fiber obtained by drawing the preform for the single-mode optical fiber is 1.9 times or more the mode field diameter when transmitting light having a wavelength of 1.55 μm.

The distribution of intensity of the light which is propagated in the single-mode optical fiber in the optical fiber diameter direction draws a sharp bell curve wherein the intensity is largest at the center and sharply tapers off when the light goes toward the outer circumference. If there is a factor absorbing the light in the part in which the light is propagated, the light is absorbed at that part and the intensity is reduced, thereby to induce an increase of the transmission loss. However, the intensity of the light is not uniform with respect to the diameter direction of the optical fiber, and therefore the intensity which is reduced due to the absorption of the light differs in the diameter direction of the optical fiber. More specifically, it was found that where there was a factor absorbing light in the part of the sharply tapered off parts of the aforesaid intensity distribution, there was little effect on the overall intensity of the light, but as the absorbing factor approached the center part, the amount of the light absorbed became larger and the overall light intensity was reduced.

Applying this theory to a conventional optical fiber, as the defects of the glass which cause the formation of the Si-H bonds functioning as the factor absorbing the light are positioned away from the part in which the light is propagated, that is, the mode filed, the amount of light which is absorbed becomes smaller. When exceeding a certain limit, it can be said that, it becomes possible to ignore that influence. More specifically, it is sufficient so far as the boundary surface caused by the different producing (manufacturing) steps is positioned away from the mode filed to a certain extent. Therefore, the inventors carried out experiments so as to prove this and succeeded in expressing how much the aforesaid boundary surface has to be positioned away from the mode filed by a value obtained by dividing the diameter of the aforesaid boundary surface in the optical fiber by the mode field diameter (hereinafter, simply referred to as a "boundary surface diameter/mode field diameter").

BEST MODE FOR CARRYING OUT THE INVENTION

First Embodiment: Dispersion-Shifted Single-Mode Optical Fiber

Figure 1:
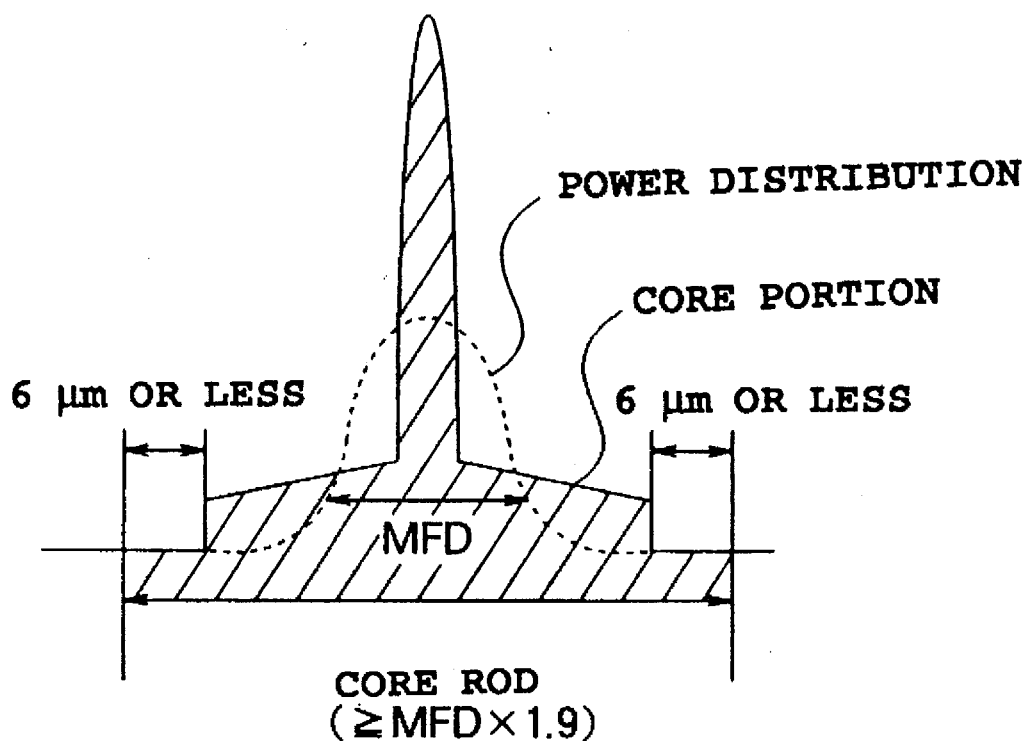
FIG. 1 is a characteristic view of the cross-section of an optical fiber of the present invention.

Below, as a first embodiment of the optical fiber of the present invention, an example of a dispersion-shifted single-mode optical fiber (DSF) will be explained in detail by referring to the drawings.

The experiment leading to the discovery of the DSF of the present invention was carried out as follows. (1) First, a porous glass body of a core rod for the DSF containing at least a so-called core portion was synthesized by for example the VAD method (at present, frequently part of the cladding portion is synthesized together with the core portion). Note that, the invention is not restricted to the VAD method: it is also possible to synthesize the porous glass body by the OVD method. In the following example, an example according to the VAD method is shown. (2) That porous glass body was dehydrated and sintered to prepare a core rod. (3) That core rod was used as a target rod, and a porous glass layer corresponding to the cladding layer was formed on the circumference thereof by the OVD method. (4) Thereafter, that porous glass layer was dehydrated and made into a glass, thereby to obtain a preform for a DSF; then (5) it was heat-drawn by a well-known customary method, whereby a DSF was obtained.

The construction and characteristic of that optical fiber will be shown in FIG. 1.

At this time, the value obtained by dividing the outer diameter, corresponding to that where the core rod for the DSF becomes the DSF in the later steps, by the mode field diameter ("boundary surface diameter/mode field diameter") was gradually changed to manufacture the core rod for the DSF.

Figure 2:
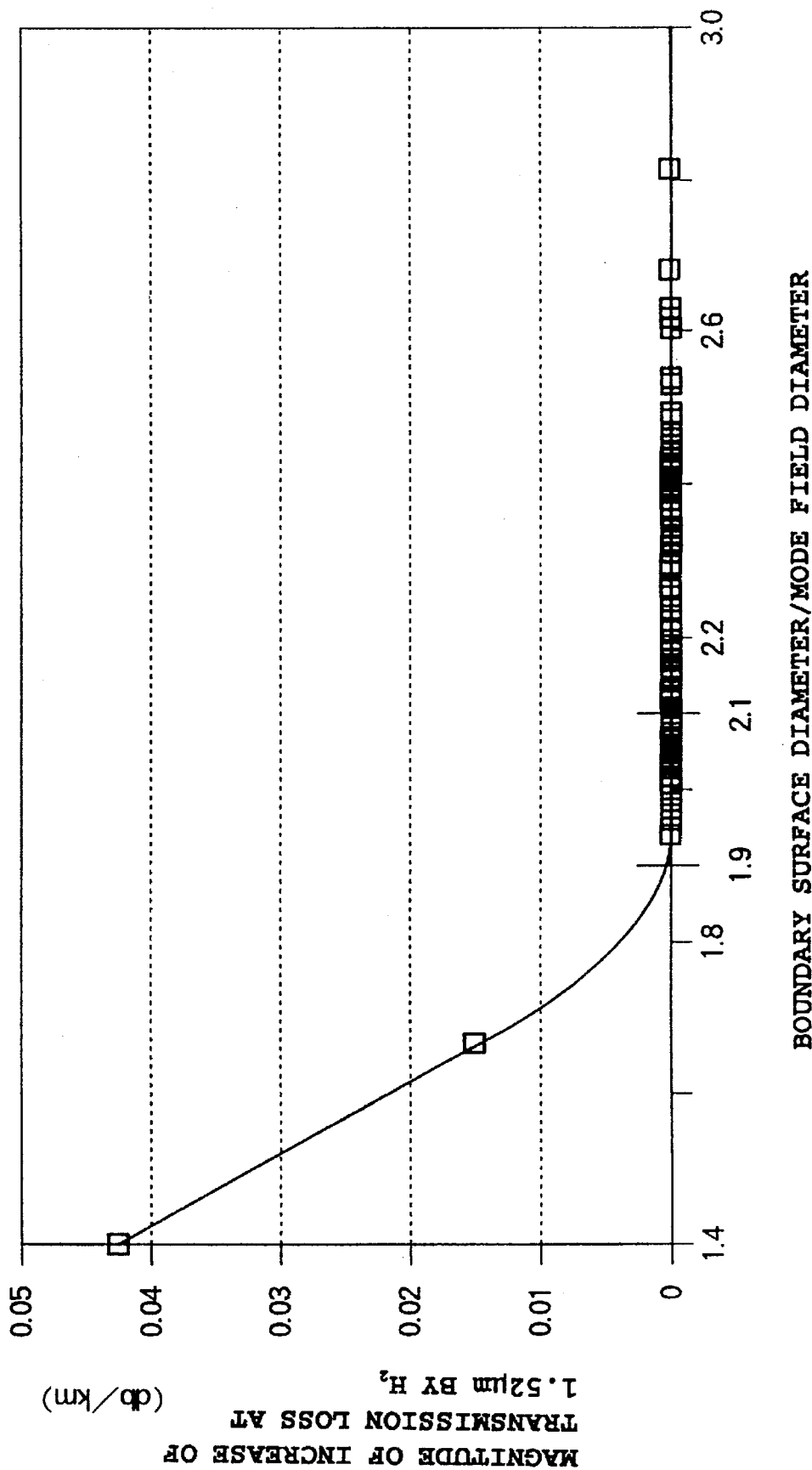
FIG. 2 is a graph showing the results of an experiment on the boundary surface diameter/mode field diameter and a magnitude of absorption of light at a wavelength of 1.52 μm carried out on an example of a dispersion-shifted single-mode optical fiber according to a first embodiment of the present invention.

Subsequently, the obtained optical fiber was left to strand at room temperature in a hydrogen atmosphere of 1 atmosphere for 8 hours and further left to stand at room temperature in the atmosphere for 48 hours. The magnitude of absorption of light at the wavelength 1.52 μm, that is, the magnitude of the increase of the hydrogen loss, was measured. The result thereof is shown in FIG. 2. Note that, in FIG. 2, the abscissa indicates a boundary surface diameter/ mode field diameter, and the ordinate indicates the magnitude of the increase of the hydrogen loss.

It is seen from FIG. 1 and FIG. 2 that the absorption of the light at the wavelength 1.52 μm can be ignored so far as the value of the boundary surface diameter/mode field diameter is 1.9 or more. Further, where the value of the boundary surface diameter/mode field diameter is set to 2.1 or more, no absorption of light was detected. Accordingly, where the value of the boundary surface diameter/mode field diameter is 2.1 or more, it can be considered that any influence of absorption of light can be ignored.

Figure 3:
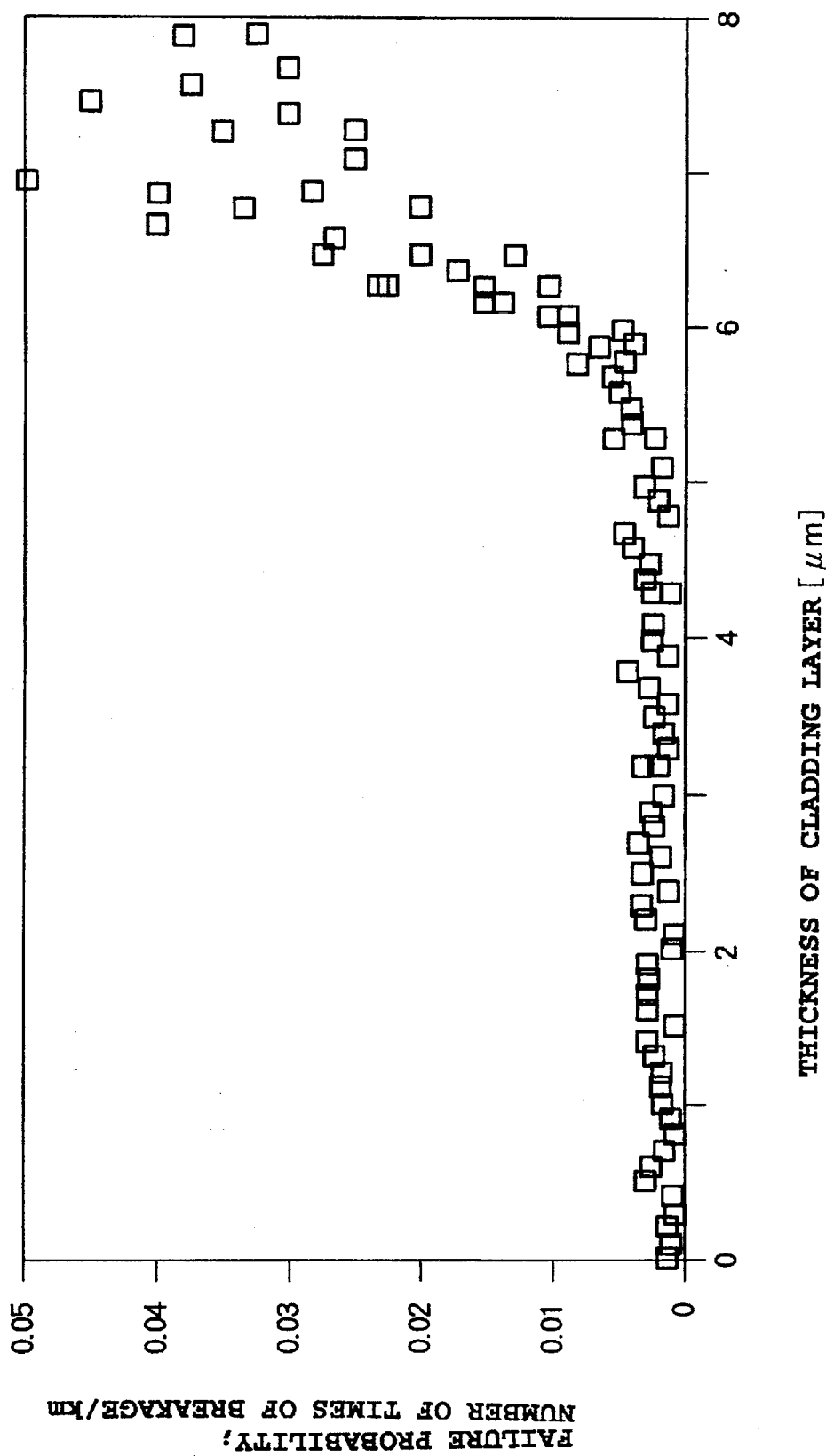
FIG. 3 is a graph showing a relationship between a thickness of a cladding layer not containing a metal dopant on the outer circumference of the core rod and the fiber failure probability found from experiments carried out on an example of a dispersion-shifted single-mode optical fiber according to the first embodiment of the present invention.

Also, the failure probability when the elongation of 0.5 percent was applied to the overall length of the fiber used in the experiment for 1 second at this time was measured. FIG. 3 shows the relationship between the thickness of the cladding layer not containing the metal dopant on the outer circumference of the core rod of the fiber and the failure probability. It is seen from the result of this that the failure probability tends to depend upon the thickness of the cladding layer not containing the metal dopant on the outer circumference of the core rod. Particularly, when the thickness of the cladding layer exceeds 6 μm, the failure probability is abruptly increased. For this reason, to obtain a fiber having a high strength, it can be considered that the thickness of the cladding layer must be restricted to to 6 μm or less.

As described above, according to the preform for a DSF and the manufacturing method of a DSF of the present invention, a DSF is little influenced by defects, does not cause an increase of hydrogen loss, and has a high strength is provided.

Second Embodiment: Single-Mode Optical Fiber

Below, as a second embodiment of the optical fiber of the present invention, a detailed explanation will be made of a single-mode optical fiber by referring to FIG. 1 and FIG. 4.

The experiment leading to the discovery of the single-mode optical fiber of the present invention was carried out in the following way. First, a porous glass body of a core rod for an optical fiber containing at least a so-called core portion was synthesized by for example the VAD method (at present, frequently part of the cladding portion is synthesized together with the core portion). Note that the invention is not restricted to the VAD method: it is also possible to synthesize the porous glass body by the OVD method, but in the following example, an example using to the VAD method is shown. That porous glass body was dehydrated and sintered to prepare a core rod. Subsequently, that core rod was used as a target rod, and a porous glass layer corresponding to the cladding layer was formed on the circumference thereof by the OVD method. Then, that porous glass layer was dehydrated and made into glass, thereby to obtain a preform for optical fiber. This was then heat-drawn by a well-known customary method, whereby a single-mode optical fiber was obtained.

At this time, in the same way as the first embodiment, a value obtained by dividing the outer diameter, corresponding to that where the core rod for the optical fiber becomes the optical fiber in the later steps, by the mode field diameter ("boundary surface diameter/mode field diameter") was gradually changed to manufacture a core rod for the optical fiber.

Subsequently, the obtained optical fiber was left to stand at room temperature in a hydrogen atmosphere of 1 atmosphere for 8 hours, and further left to stand at room temperature in the atmosphere for 48 hours. The magnitude of absorption of light at the wavelength 1.52 μm, that is, the magnitude of the increase of the hydrogen loss, was measured. The result thereof is shown in FIG. 4. Note that, in FIG. 4, the abscissa indicates the boundary surface diameter/mode field diameter, and the ordinate indicates the magnitude of the increase of the hydrogen loss.

Figure 4:
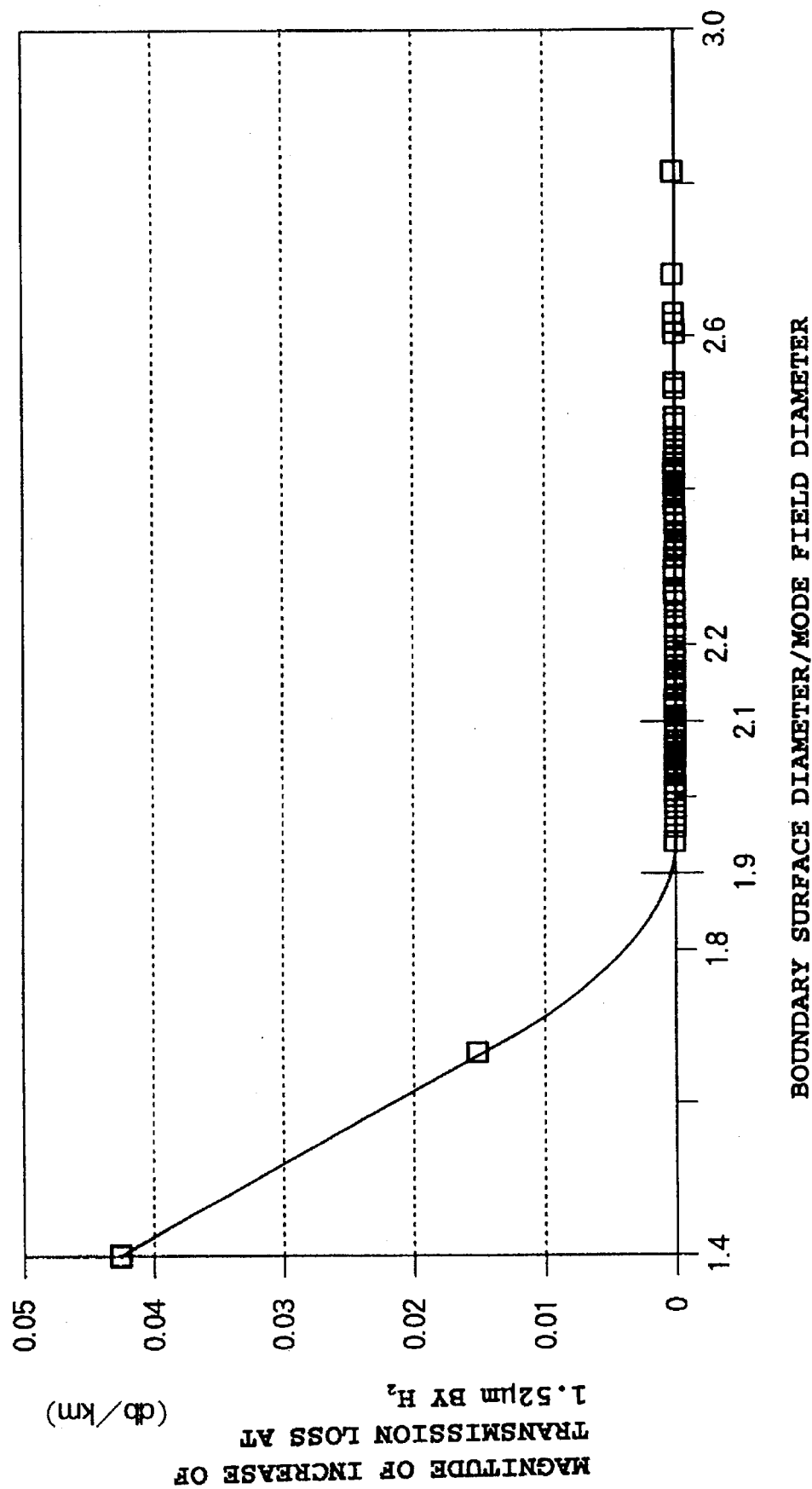
FIG. 4 is a graph showing the results of an experiment carried out on a single-mode optical fiber according to a second embodiment of the present invention.

It is seen from FIG. 4 that the absorption of the light in the wavelength 1.52 μm can be ignored so far as the value of the boundary surface diameter/mode field diameter is 1.9 or more. Further, where the value of the boundary surface diameter/mode field diameter is set to 2.1 or more, no absorption of light was detected. Accordingly, where the value of the boundary surface diameter/mode field diameter is 2.1 or more, it can be considered that any influence of absorption of light can be ignored.

According to the present invention, a preform for a single-mode optical fiber with which a single-mode optical fiber little influenced by defects and high in strength can be obtained can be provide. Further, a desired single-mode optical fiber is provided from the preform thereof.

APPLICABILITY OF UTILIZATION IN INDUSTRY

The dispersion-shifted single-mode optical fiber and the single-mode optical fiber of the present invention may be utilized in various fields such as optical communication and measurement.

We claim:

1. In a method of producing a silica glass optical fiber preform by dehydrating and making into a glass a porous glass body of a core rod for a dispersion-shifted single-mode optical fiber to prepare a core rod for the optical fiber, depositing a cladding layer substantially not containing a metal dopant on the circumference of said core rod for the optical fiber so as to give an outer diameter of a desired value, and then dehydrating and making into a glass the same, a method of producing a preform for a dispersion-shifted single-mode optical fiber wherein an optical fiber preform is manufactured so that the diameter of a part corresponding to the core rod for the optical fiber is 1.9 times or more the mode field diameter when the optical fiber preform is processed and formed into a dispersion-shifted single-mode optical fiber and light having a wavelength of 1.55 μm is transmitted to this optical fiber and wherein the thickness of the cladding layer which exists in an outer layer portion of the core rod and substantially does not contain the metal dopant is within a range of from 0 to 6 μm with respect to an optical fiber having a diameter of 125 μm.

2. A method of producing a dispersion-shifted single-mode optical fiber as set forth in claim 1, which produces a dispersion-shifted single-mode optical fiber such that, when the optical fiber preform is drawn and a light having a wavelength of 1.55 μm is transmitted to this optical fiber, the diameter of a part corresponding to the core rod is 1.9 times or more the mode field diameter and the thickness of the cladding layer existing in the outer layer portion of the core rod is within a range of from 0 to 6 μm with respect to an optical fiber having a diameter of 125 μm.

3. A dispersion-shifted single-mode optical fiber produced by the steps in which a porous glass body of a core rod for a dispersion-shifted single-mode optical fiber is dehydrated and made into a glass to prepare a core rod for the optical fiber; a cladding layer substantially not containing the metal dopant is deposited on the circumference of the core rod for the optical fiber so as to give an outer diameter of a desired value and then are dehydrated and made into a glass to thereby produce a silica glass type optical fiber preform; and said optical fiber preform is drawn, said dispersion-shifted single-mode optical fiber characterized in that it is formed so that the diameter of a part corresponding to the core rod is 1.9 times or more the mode field diameter when transmitting light having a wavelength of 1.55 μm to the dispersion-shifted single-mode optical fiber and the thickness of the cladding layer existing in the outer layer portion of the core rod is within a range of from 0 to 6 μm with respect to an optical fiber having a diameter of 125 μm.

4. A dispersion-shifted single-mode optical fiber characterized in that it is formed so that the diameter of a part corresponding to the core rod is 1.9 times or more the mode field diameter when transmitting light having a wavelength of 1.55 μm and the thickness of the cladding layer existing in the outer layer portion of the core rod is within a range of from 0 to 6 μm with respect to an optical fiber having a diameter of 125 μm.

5. In a method of producing a single-mode optical fiber preform by dehydrating and making into a glass a porous glass body of a core rod for a single-mode optical fiber to prepare a core rod for the optical fiber, depositing cladding layers on the circumference of the core rod for the optical fiber so as to give an outer diameter of a desired value, and then dehydrating and making into a glass the same, a method of producing a preform for a single-mode optical fiber wherein an optical fiber preform is produced so that the diameter of a part corresponding to the core rod for the optical fiber of the single-mode optical fiber obtained by drawing the preform for a single-mode optical fiber is 1.9 times or more the mode field diameter when light having a wavelength of 1.55 μm is transmitted to the single-mode optical fiber obtained by drawing.

6. A method of producing a single-mode optical fiber as set forth in claim 5, wherein a single-mode optical fiber drawn from the preform for an optical fiber is produced so that the diameter of a part corresponding to the core rod is 1.9 times or more the mode field diameter when the optical fiber preform is drawn and light having a wavelength of 1.55 μm is transmitted to this optical fiber.

7. A single-mode optical fiber formed from a single-mode optical fiber preform, said single-mode optical fiber preform being formed by the steps of forming an optical fiber core rod by dehydrating a porous glass body of a core rod for a single-mode optical fiber and making into a glass, depositing a cladding layer on the circumference of the formed optical fiber core rod to give an outer diameter of a desired value to result in the single-mode optical fiber preform, and said single-mode optical fiber being formed by drawing the produced single-mode optical fiber preform, characterized in that said single-mode optical fiber is formed so that the diameter of a part corresponding to the core rod is 1.9 times or more a mode field diameter when transmitting light having a wavelength of 1.55 μm.

8. A single-mode optical fiber characterized in that it is formed so that the diameter of a part corresponding to the core rod is 1.9 times or more a mode field diameter when transmitting light having a wavelength of 1.55 μm.

9. A Single-mode optical fiber as set forth in claim 7, wherein the dehydrated and made into glass single-mode optical fiber preform is a silica-glass optical fiber preform.

* * * * *